Patented Aug. 13, 1929.

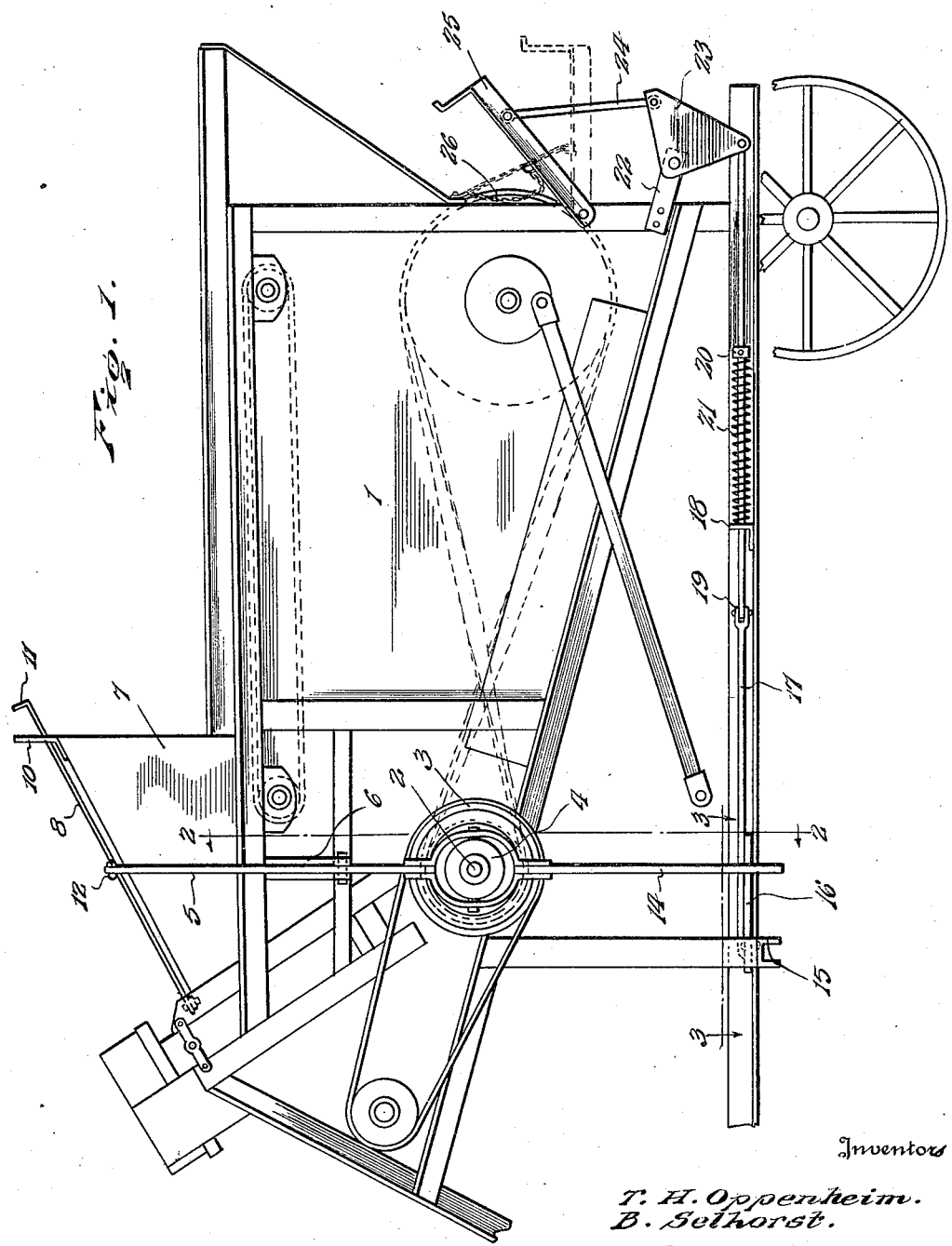

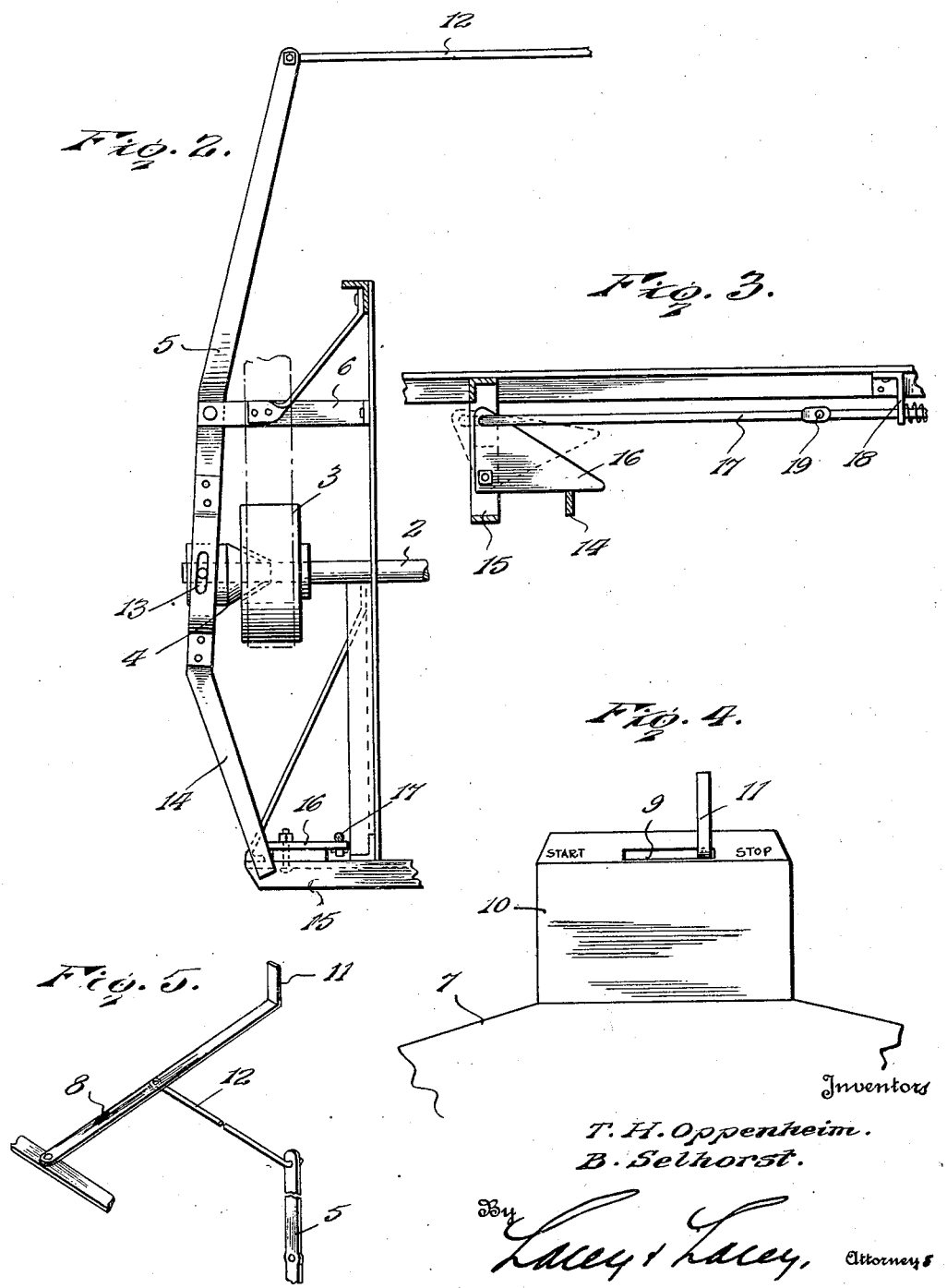

1,724,612

UNITED STATES PATENT OFFICE.

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO.

SAFETY DEVICE.

Application filed August 3, 1927. Serial No. 210,363.

This invention is a safety device for use in connection with clutches whereby driving mechanisms are controlled. The device is intended primarily for use upon corn-husking machines but may be used in other machines where there is possibility of injury to persons or damage to machinery when an operator leaves the machine and forgets to open the clutch so as to stop the driving gearing. The object of the present invention is to provide means whereby when the operator leaves his platform the clutch will be opened and the driving machinery consequently will cease to move, a further object of the invention being to so arrange the mechanism that the clutch will remain open when the operator resumes his position upon the platform until the clutch lever has been positively actuated through manually operable devices. A secondary object of the invention is to so arrange the mechanism that the parts of the invention will be disposed within the lines of the machine without involving any substantial structural changes therein. Other incidental objects of the invention will appear in the course of the following description, and the invention resides in certain novel features which are illustrated in the accompanying drawings and will be particularly pointed out in the appended claims.

In the drawings:

Figure 1 is a side elevation of so much of a corn-husking machine as is necessary to an understanding of the invention, the mechanism embodying the invention being shown applied to the machine;

Fig. 2 is a detail vertical transverse section on the line 2—2 of Fig. 1;

Fig. 3 is a detail horizontal section on the line 3—3 of Fig. 1;

Fig. 4 is a detail elevation of the front end of the hopper, and

Fig. 5 is a detail perspective view of the manually operable devices for setting the clutch controlling lever.

The corn-husking machine is illustrated in a more or less conventional manner at 1 and includes a transverse shaft 2 which transmits motion through suitable gearing from a main driving pulley to the different working parts of the machine, a clutch member 3 being rotatably mounted upon the said shaft and a cooperating clutch member 4 being slidably mounted upon the shaft and connected with a clutch controlling lever 5 which is fulcrumed upon a bracket 6 on the frame of the machine above the clutch. The husking machine also includes a hopper 7 located upon the top of the machine in front of and adjacent the corn-snapping rolls and through which the corn stalks are fed to said rolls. Mounted upon the hopper 7 is a hand lever 8 which extends through a slot 9 in a guide plate 10, projecting from the front of the hopper, and has its front end upturned to constitute a handle 11 in front of said guide plate. A link 12 connects the said hand lever 8 with the upper end of the clutch lever 5, and it will be understood that lateral movement of the hand lever will rock the clutch controlling lever so as to open or close the clutch.

The clutch-controlling lever has a pin and slot connection with the movable clutch member 4, as shown at 13 in Fig. 2, and it is extended below the clutch and bent inwardly toward the side of the machine, as shown at 14. A bracket 15 is provided on the side of the machine frame at the bottom thereof and mounted upon the said bracket is a locking plate 16 which may conveniently be in the form of a bell crank or triangular plate, as shown most clearly in Fig. 3. When this locking plate is swung outwardly, as shown in full lines in Fig. 3, it will bear against the inner side of the lower end of the clutch-controlling lever and rock the same outwardly so that the clutch will be released and will be held in released position. Pivoted to the inner corner of the locking plate 16 is the rear end of a push rod 17 which is slidably supported in a bracket 18 secured upon the lower frame bar of the machine and the said push bar, it will be noted, is constructed in two sections which are hingedly connected, as indicated at 19, whereby the rear section will be permitted to conform to the varying angular position of the locking plate as the same moves about its fulcrum. In advance of the bracket 18, a collar 20 is secured upon the push rod and an expansion spring 21 is coiled around the rod and bears at its ends against the said collar and the bracket 18 so that it tends constantly to move the push bar to its forward position and thereby maintain the locking plate in its operative position illustrated by the full lines in Fig. 3. Fulcrumed upon the front end of the machine frame, as upon a bracket 22, is a second bell crank or angle lever 23 which has its lower end pivotally connected with the front end of the push bar 17. The upper front end of this bell crank or angle lever is pivotally attached to the lower end of a pitman 24 which has its upper end pivotally attached to the operator's platform 25, the platform being hinged to the front end of the machine frame and being limited in its downward movement by a chain 26 attached at one end to the platform and at its opposite end to the machine frame above the platform. It will be noted at once that the expansion of the spring 21 tends to hold the platform in the raised position shown in full lines in Fig. 1, and it will be understood that the spring may be arranged in other positions whereby it will act upon the platform, although the illustrated position is preferred inasmuch as it has the advantage of compactness and disposes the spring in a location where it is not apt to be damaged by chance blows. It will also be understood that the chain or flexible connection 26 is only one of many devices which may be used to limit the downward movement of the platform.

It is thought the operation of the device will be readily understood from the foregoing description, taken in connection with the accompanying drawings. When the machine is not in operation, the parts will assume the position shown in the drawings, the platform being raised and the parts connected therewith being consequently drawn into their forward positions so that the clutch lever 14 will be thrown out and the clutch opened. When the operator assumes his position upon the platform, the platform will, of course, be swung downwardly to the position shown in Fig. 1 by dotted lines, and this movement of the platform will be transmitted through the bell crank 23 and the push rod 17 to the locking plate 16 so that the locking plate will be swung inwardly and rearwardly to the position shown in dotted lines in Fig. 3. The locking plate will, therefore, be swung away from the clutch-controlling lever but the clutch will remain open until the clutch lever has been rocked through manipulation of the hand lever 8 at which time the operator will be upon the platform and in position to control the feeding of the corn stalks to the machine. Inasmuch as the hand lever 8 is mounted on top of the hopper which is on the roof of the machine, premature closing of the clutch is not apt to occur and the clutch cannot be closed until after the platform has been moved to its lowered position. This feature of the mechanism is important inasmuch as careless persons sometimes place tools upon the platform and the weight of the same tends to swing the platform downwardly and results in closing of the clutch with many devices now in use. With our mechanism, however, the mere lowering of the platform will not close the clutch inasmuch as it simply moves the locking plate away from the clutch controlling lever and it is necessary to then manually shift the said lever in order to close the clutch. When the operator leaves the platform, the spring 21 at once swings the platform to its inoperative position and this movement is transmitted through the intermediate connections to the locking plate which is at once swung outwardly and shifts the clutch controlling lever to the released position. It will be seen that we have provided an exceedingly simple, compact and efficient mechanism which will positively operate to open or release the clutch when an operator leaves the machine so that the machine cannot operate unless the operator is in position.

Having thus described the invention, we claim:

1. The combination with a clutch-controlling lever, of a vertically movable element, yieldable means for holding the element normally in raised position, and means independent of the clutch controlling lever and controlled by said yieldable means to hold the lever in clutch-released position when said element is in normal position.

2. The combination with a clutch-controlling lever, of an element mounted for swinging movement in a vertical plane, means for yieldably holding said element raised, and a lever locking device free of the clutch controlling lever and operatively connected with the said element whereby when the element is raised the lever will be held in clutch-released position and when the element is lowered the clutch-controlling lever may be operated to close the clutch.

3. The combination with a clutch-controlling lever, of a movable platform, means for yieldably holding the platform in inoperative position, means connected with the platform for locking the clutch-controlling lever in clutch-released position when the platform is in inoperative position, and manually operable means for setting the clutch-controlling lever to close the clutch when the platform is in operative position.

4. The combination with a clutch-controlling lever, of a movable platform, a locking plate mounted adjacent the lower end of the clutch-controlling lever in position to bear against the same, and connections between said locking plate and the platform whereby when the platform is in inoperative position the locking plate will be in contact with the clutch-controlling lever to maintain the same in clutch-released position.

5. The combination with a clutch-controlling lever, of a movable platform, a push bar slidably mounted between the platform and the lever, a locking plate fulcrumed adjacent the lower end of the lever to bear against the same and pivotally connected to one end of the push bar, yieldable means acting on the push bar for holding the platform in inoperative position and operative connections between the opposite end of the push bar and the platform whereby when the platform is in inoperative position the lever will be held in clutch-released position.

6. The combination of a clutch-controlling lever, a movable platform, a slidably mounted push bar disposed between the platform and the lever, a bell crank lever connected with the front end of the push bar, a pitman connecting said lever with the platform, a locking plate connected with the rear end of the push bar and arranged to bear against the end of the clutch-controlling lever whereby when the platform is in inoperative position the lever will be held in clutch-released position, and yieldable means for holding the platform in inoperative position.

7. The combination of a supporting frame, a driven shaft, a clutch on the shaft, a clutch-controlling lever fulcrumed on the frame above the clutch and extending across and operatively connected with the clutch, manually operable means above the frame connected with the upper end of the clutch-controlling lever to set the clutch, a push bar slidably mounted on the frame below the clutch, a locking plate pivotally mounted on the frame and having one end pivoted to the rear end of the push bar, the free end of the plate being arranged to bear against the side of the clutch-controlling lever below the clutch, a platform hingedly mounted on the front end of the frame, yieldable means for holding the platform raised, and connections between the front end of the push bar and the platform whereby when the platform is raised the locking plate will be held against the clutch-controlling lever and the lever held in clutch-released position and when the platform is lowered the locking plate will be free of the lever and the manually operable means may be actuated to rock the lever and close the clutch.

In testimony whereof we affix our signatures.

THEODORE H. OPPENHEIM. [L. S.]
BERNARD SELHORST. [L. S.]